(12) United States Patent
Palanisamy

(10) Patent No.: US 12,556,556 B2
(45) Date of Patent: Feb. 17, 2026

(54) SYSTEM AND METHOD FOR DETECTING FRAUDULENT NETWORK TRAFFIC

(71) Applicant: Sandvine Corporation, Waterloo (CA)

(72) Inventor: Anuram Palanisamy, Coimbatore (IN)

( * ) Notice: Subject to any disclaimer, the term of this patent is extended or adjusted under 35 U.S.C. 154(b) by 358 days.

(21) Appl. No.: 18/186,409

(22) Filed: Mar. 20, 2023

(65) Prior Publication Data

US 2024/0121255 A1  Apr. 11, 2024

(30) Foreign Application Priority Data

Mar. 19, 2022  (IN) .............................. 202211015267
Mar. 17, 2023  (EP) .................................... 23162613

(51) Int. Cl.
H04L 29/06 (2006.01)
H04L 9/40 (2022.01)

(52) U.S. Cl.
CPC ...... H04L 63/1425 (2013.01); H04L 63/1416 (2013.01)

(58) Field of Classification Search
CPC ........................ H04L 63/1425; H04L 63/1416
See application file for complete search history.

(56) References Cited

U.S. PATENT DOCUMENTS

| | | | |
|---|---|---|---|
| 2006/0212931 A1* | 9/2006 | Shull ..................... | H04L 63/104 726/10 |
| 2015/0242415 A1 | 8/2015 | Martini et al. | |
| 2016/0373409 A1 | 12/2016 | Zhu et al. | |
| 2017/0323102 A1* | 11/2017 | Manadhata ............. | G06F 21/57 |
| 2018/0084006 A1* | 3/2018 | Kwan .................. | H04L 63/0227 |
| 2018/0295142 A1* | 10/2018 | Manadhata ......... | H04L 63/1416 |
| 2018/0367321 A1* | 12/2018 | Stammers ............... | H04W 4/24 |
| 2020/0127966 A1* | 4/2020 | Reddy ...................... | H04L 67/61 |
| 2020/0267065 A1* | 8/2020 | Bartik ................... | H04L 43/067 |
| 2021/0120015 A1* | 4/2021 | Rajaram ............. | H04L 63/1458 |
| 2021/0377303 A1* | 12/2021 | Bui ......................... | G06F 40/14 |
| 2024/0064107 A1* | 2/2024 | Qiu ..................... | H04L 63/1416 |

FOREIGN PATENT DOCUMENTS

EP           3306889 A1    4/2018

OTHER PUBLICATIONS

European Search Report, European Patent Office, on corresponding EP Application No. 23162613.6, dated Jun. 5, 2023.

* cited by examiner

*Primary Examiner* — William A Corum, Jr.
(74) *Attorney, Agent, or Firm* — Amarok IP Inc.; Neil W. Henderson

(57) ABSTRACT

A method for detecting fraudulent traffic in a computer network including: receiving a packet from a traffic flow; determining data associated with the traffic flow; determining a score associated with each piece of determined data; aggregating an overall score for the traffic flow; and determining whether the traffic flow is trusted based on the overall score. A system for detecting fraudulent traffic in a computer network including: a data processing engine configured to receive a packet from a traffic flow; a data collection module configured to determine data associated with the traffic flow; a data correlation module configured to determining a score associated with each piece of determined data and aggregating an overall score for the traffic flow; and a traffic classification module configured to determine whether the traffic flow is trusted based on the overall score.

12 Claims, 6 Drawing Sheets

+ Smart Net

Oferta de 1ª mensalidade de uma Smart Net com 10GB/mês adicionais (1)

| MESSAGING | SOCIAL | VIDEO |
|---|---|---|
| € 4,99 /mês<br>€ 6,99 /mês<br>1 mês grátis<br>(Aderir) | € 4,99 /mês<br>€ 6,99 /mês<br>1 mês grátis<br>(Aderir) | € 4,99 /mês<br>€ 6,99 /mês<br>1 mês grátis<br>(Aderir) |
| MUSIC | EMAIL&CLOUD | MEO |
| € 4,99 /mês<br>€ 6,99 /mês<br>1 mês grátis<br>(Aderir) | € 4,99 /mês<br>€ 6,99 /mês<br>1 mês grátis<br>(Aderir) | Tráfego grátis para apps MEO já incluído no seu tarifário |

FIG. 2

SYSTEM AND METHOD FOR DETECTING FRAUDULENT NETWORK TRAFFIC

RELATED APPLICATIONS

The present application claims priority to Indian Patent Application Number 202211015267 filed Mar. 19, 2022 and European Patent Application Number 23162613.6 filed Mar. 17, 2023, which are hereby incorporated in their entirety herein.

FIELD

The present disclosure relates generally to handling of computer network traffic. More particularly, the present disclosure relates to a system and method for detecting fraudulent traffic in a computer network.

BACKGROUND

Encryption of network traffic continues to increase, making it more difficult to determine the type of network traffic within an operator's network. With encryption identifying an application or type of traffic is a challenge. Identifying as much traffic as possible to a category or traffic or an application is key for taking any action or decision on the network traffic and determining that traffic is being charged at an appropriate rate to the subscriber. Traffic identification may be needed when various applications are being charged at different rates, and if users are attempting to masquerade one category of traffic as another.

If traffic cannot be properly classified, the network operator may be losing out on revenue and may not be able to make network upgrade decisions based on reliable data. With much of the traffic information being encrypted, it is becoming increasingly difficult to determine whether the traffic is being charged at the appropriate rate and whether subscribers are inappropriately taking advantage of any promotions or discounts.

As such, there is a need for an improved system and method for detecting fraudulent traffic in a computer network.

The above information is presented only to assist with an understanding of the present disclosure. No determination has been made, and no assertion is made, as to whether any of the above might be applicable as prior art with regard to the present disclosure.

SUMMARY

In a first aspect, a method is provided for detecting fraudulent traffic in a computer network, the method includes: receiving a packet from a traffic flow; determining data associated with the traffic flow; determining a score associated with each piece of determined data; aggregating an overall score for the traffic flow; and determining whether the traffic flow is trusted based on the overall score.

In some cases, determining the data associated with the traffic flow includes: determining whether there is Domain Name Server (DNS) data associated with the traffic flow; determining Content Delivery Network (CDN) information about a server associated with a traffic flow; and determining profile information associated with the server.

In some cases, the profile information associated with the server may include an application type ratio served by the server.

In some cases, determining the score associated with the determined data may include determining the application type of the traffic flow and comparing the application type with the application type ratio served by the server.

In some cases, the method may further include: comparing the CDN information with previously stored CDN information; and determining a score associated with the trustworthiness of the CDN information based on the comparison.

In some cases, the method may further include: using machine learning to identify the traffic type of the traffic flow.

In some cases, the traffic flow may be considered trusted if the overall score is above a predetermined threshold.

In some cases, the method may further include: blocking the traffic flow if the traffic flow is considered to be not trusted.

In some cases, the method may further include: applying traffic actions to the traffic flow if the traffic flow is considered to be not trusted.

In another aspect, there is provided a system for detecting fraudulent traffic in a computer network, the system includes: a data processing engine configured to receive a packet from a traffic flow; a data collection module configured to determine data associated with the traffic flow; a data correlation module configured to determine a score associated with each piece of determined data and aggregate an overall score for the traffic flow; and a traffic classification module configured to determine whether the traffic flow is trusted based on the overall score.

In some cases, the data collection module may be configured to: determine whether there is Domain Name Server (DNS) data associated with the traffic flow; determine Content Deliver Network (CDN) information about a server associated with a traffic flow; and determine profile information associated with the server.

In some cases, the profile information may be associated with the server includes an application type ratio served by the server.

In some cases, the data correlation module may be configured to compare an application type of the traffic flow with the application type ratio served by the server.

In some cases, the data correlation module may be configured to: compare the CDN information with previously stored CDN information; and determine a score associated with the trustworthiness of the CDN information based on the comparison.

In some cases, the data correlation module may be configured to use machine learning to identify the traffic type of the traffic flow.

In some cases, the traffic flow may be considered trusted if the overall score is above a predetermined threshold.

In some cases, the data processing engine may be further configured to block the traffic flow if the traffic flow is considered to be not trusted.

In some cases, the data processing engine may be further configured to provide traffic actions to the traffic flow if the traffic flow is considered to be not trusted.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 2 illustrates an example network operator subscription options;

DETAILED DESCRIPTION

Generally, the present disclosure provides a method and system for fraudulent traffic detection. The system is configured to receive a traffic flow and determine data associated with the traffic flow. The data associated with the data flow is intended to be reviewed and scored based on the determined trustworthiness of the collected data. The scored data may be aggregated to determine an overall trustworthiness score of the traffic flow. With an overall score, the system may determine the likelihood of the traffic flow being fraudulent. In some cases, traffic actions or analytics may be determined based on the likelihood of the traffic flow being fraudulent.

Figure 1:
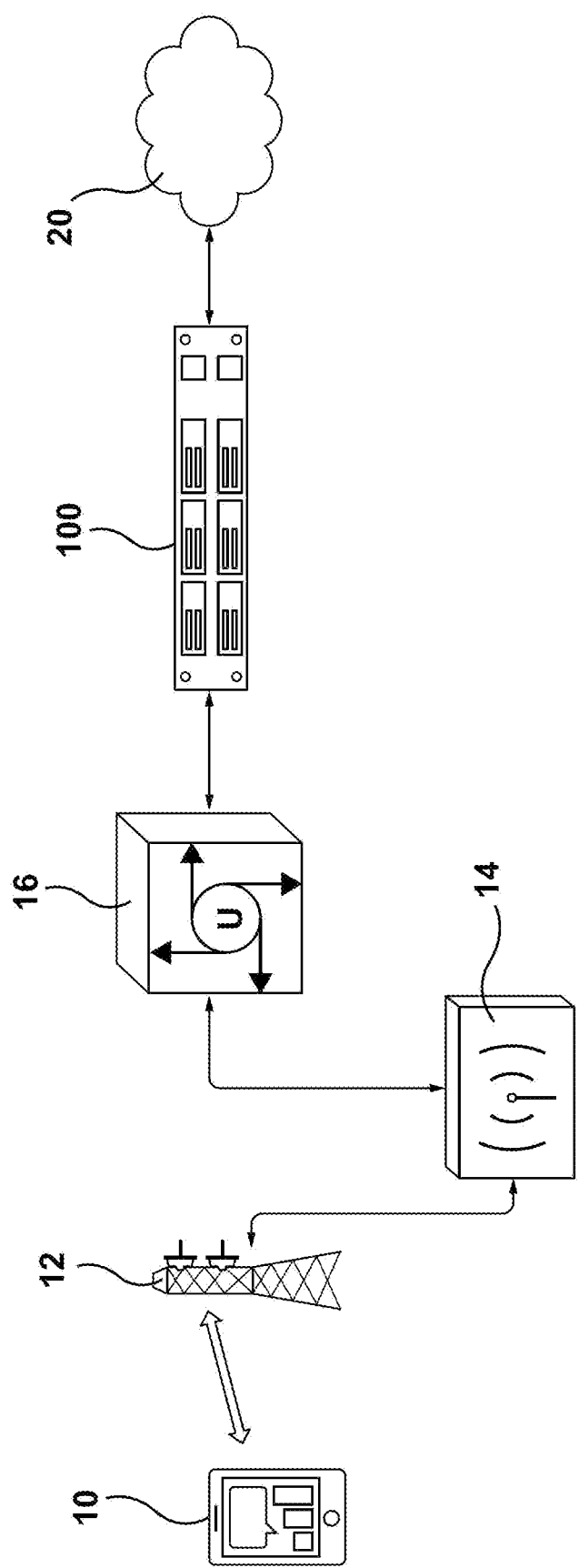
FIG. 1 illustrates an environment for computer network traffic over an operator network.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by an operator network 16 and may be reviewed and classified by a system 100 for fraud detection. The system 100 may include or be a component of a network device which reside between the operator's gateway and the Internet 20. The system 100 is intended to reside within the operator's or Internet Service Provider's (ISP's) network 16 and use a pre-trained supervised machine learning model to analyze the traffic flows at various time slices and determine or predict what application is being transmitted over the network. It will be understood that embodiments of the system and method detailed herein are intended to be employed over any type of computer network, for example, fixed line, mobile, satellite or other network.

Generally, network traffic generated from a specific content provider or reaching their specific server or servers use identification strings such as domain name and other specific information in the payload to identify the content provider. Network operators use such information to charge or free rate various types of traffic based on various end-user or subscriber plans.

When a network operator provides a zero-rated plan for a specific application or set of applications wherein the set of application is allowed unlimited bandwidth, some subscriber may take advantage of these subscription plans. In some cases, subscribers may use that plan for browsing other content and/or downloading large files using a tunneling application which is able to generate network tunnel traffic carrying the same or a similar domain pattern as that of a zero-rated content provider. This type of traffic flow can be considered a fraudulent traffic flow. In particular, the content and/or network flow is not initiated by the actual content provider's application, nor does the traffic go to the content provider's server. In these situations, it has been seen that the traffic goes to a tunnelling end point yet carries a traffic pattern of a zero-rated content provider. When a subscriber generates a traffic flow which looks like some other content or traffic type for any purpose, it can be considered or referred to as fraudulent traffic.

Examples of various types of fraudulent traffic include:

Altering the traffic flow patterns to look like something else to escape restrictions applied by an operator or the government;

Zero rated fraud, wherein traffic is masquerading as a traffic type that should not be charged for by the network operator;

Regulatory compliance fraud including, for example, using VoIP/VPN in a region where the use is illegal or otherwise not allowed, or other types of fraudulent traffic activities.

FIG. 2 illustrates an example subscriber plan with a zero rate option by an ISP (Internet Service Provider). In this example, a Portuguese network operator provides for zero rated access to MEO Cloud™. When the network subscriber wants to use this facility and browse non-MEO cloud related material free of change, the subscriber may use applications such as AnonyTun, HAProxy, or other similar applications, to establish a VPN tunnel which mimics or masquerades as MEO cloud traffic.

By taking these actions, the end subscriber may be able to establish a tunnel flow to a VPN server and, as traffic pattern resemble MEO Cloud traffic, conventional solutions may not provide any charging for the flow. These actions would allow the subscriber to fraudulently browse through Internet content using the established tunnel without proper payment to the network operator or network provider.

Similarly, when a subscriber is not allowed to use a VPN/VoIP application in a region the end subscriber in a particular region may decide to use an application similar to AnonyTun/HAProxy and generate tunneling flows that look like Facebook or any other general application which is allowed in that region. By doing this the subscriber would be able to bypass the regulations of that region, thus having fraudulent traffic flows. The subscriber's flow looks to have facebook.com in the payload but is tunneled and directed to a different server. The flow is simply mimicking a Facebook flow.

Embodiments of the system and method detailed herein are intended to identify these types of flow, which can be considered fraudulent flows as they endeavor to appear as something else for various reasons. Embodiments of the system and method detailed herein are intended to identify such flows using correlation techniques. Embodiments of the system and method may use a plurality of sources to determine whether the traffic flow is a genuine flow or a fraudulent flow.

Conventional solutions tend to use Domain Name Server (DNS) answer from a trusted DNS server for cross validation. When a traffic flow goes to a content provider server and/or any server where the server IP address seen in the flow is taken and checked against previously received DNS answers for the same IP. If the domain name in the DNS address belongs to the known content provider, then the flow is considered known that the server IP is the actual content provider.

If a conventional solution does not receive a valid DNS entry for the server IP before the actual traffic is seen, the system will generally not trust the flow and the flow will not be used for any zero rating or regulatory process.

This is as accurate as the DNS entries received for the server. If the system does not receive a DNS entry for genuine content, even flows with unknown or unentered DNS entries would be marked not trusted.

Conventional solutions generally rely on, for example, DNS based Trusted lists which are based on the DNS answer that may be obtained for the target content provider domain. A shortcoming of this solution is, when DNS goes encrypted, there will be a need for cross validation of the source.

Figure 3:
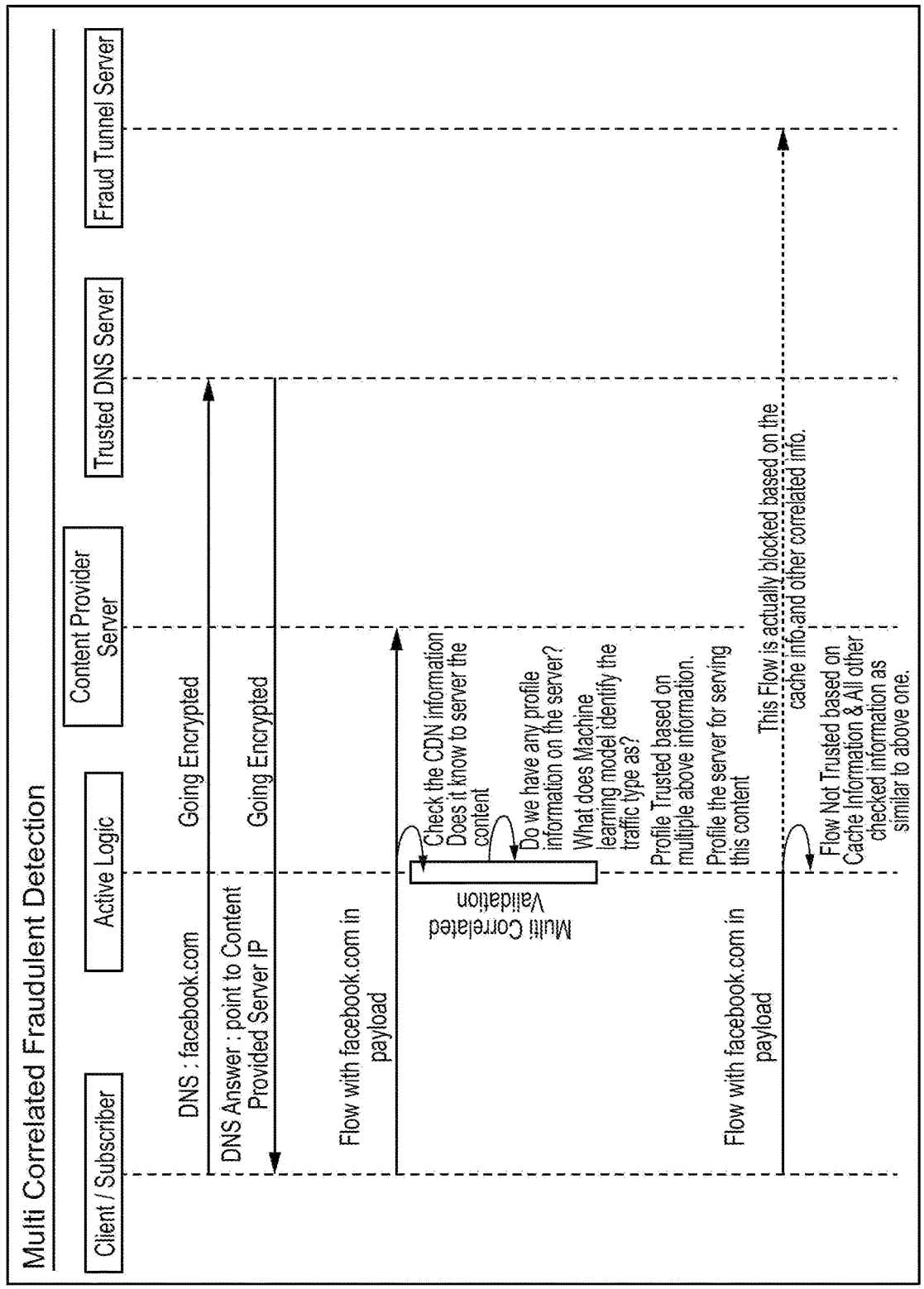
FIG. 3 is a sequence diagram of an example of a potentially fraudulent traffic flow.

FIG. 3 illustrates an example of a traffic flow via a conventional solution and via the system and method disclosed herein. When a subscriber (sometimes referred to as client) is trying to connect to an application server (facebook.com for this example), the client first initiates a request for a domain name resolution. When a DNS answer is received from a trusted DNS server with the actual content provider's IP address, the information is cached until the Time to Live (TTL) time. In some cases, the DNS information may be encrypted or otherwise hidden from Deep Packet Inspection devices.

When the traffic flow goes to the content provider and if the destination IP address is available in the DNS cache, this flow will be marked as trusted. Embodiments of the present system and method are intended to check the CDN information to determine whether the server knows the content. The system and method may determine whether there is any profile information on the server that may be used to verify or "trust" the server. The traffic flow may also be sent to traffic classification via machine learning, which identifies the traffic type. The traffic type classification received from the machine learning, or determined in another manner, is intended to be provided to the server providing. The traffic flow may be trusted based on information from a plurality of sources and trustworthiness. The trustworthiness may further include profile information of the server for serving the content, for example facebook.com could deliver a web browsing or streaming classification of traffic flows.

The flow data may also be used to take any regulatory or other traffic action, for example, zero rate the flow, block regulated content or the like. If there is a traffic flow that is carrying a pattern for an approved or actual content provider and the traffic is going to a server IP which is not in the DNS cache list or any other correlated information that does not provide a sufficiently high trustworthy score, the traffic will be classified as trusted or not and necessary regulatory action may be taken based on this information. Further, if there is a traffic flow that is masquerading with an approved text pattern in the payload but none of the correlation provides a minimum threshold trust score, it may be classified as untrustworthy or not-trusted and the traffic going to a fraudulent content provider may be blocked as noted in FIG. 3.

Shown in FIG. 3, if the DNS is encrypted conventional solutions tend to determine that the traffic flow is fraudulent. As more data and packet flow information is encrypted, conventional solutions become less and less accurate at determining whether the traffic flow is fraudulent or simply encrypted. Embodiments of the system and method noted herein are intended to address these situations.

Figure 4:
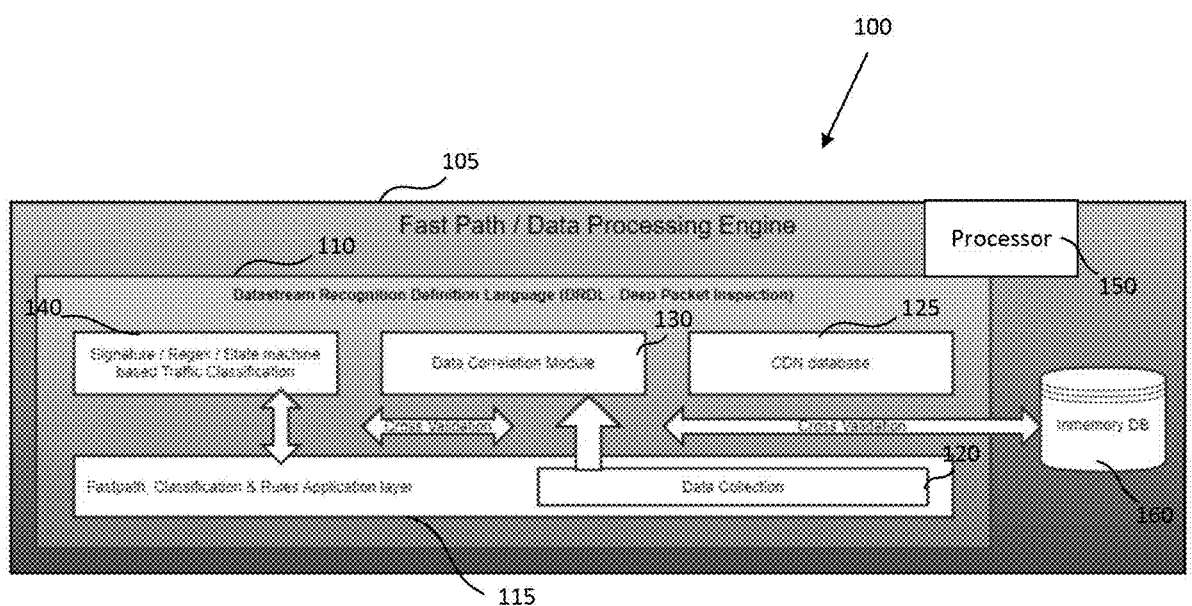
FIG. 4 illustrates an example embodiment of a system for fraudulent traffic detection according to an embodiment.

FIG. 4 illustrates a system for detecting fraudulent traffic according to an embodiment. The system includes a data processing engine 105, a deep packet inspection module 110, a Fastpath and Application layer 115, a data collection module 120, a CDN database 125, a data correlation module 130, a signature and state machine based traffic classification module 140, at least one processor 150 and a memory component 160. The system is generally intended to be distributed and reside in at least one network device on the data plane. The processor may be configured to execute the instructions stored in the memory component in order for the modules to execute their functions. The system 100 is intended to receive information from the computer network equipment that allows the system to determine traffic flow statistics and provide for traffic action instructions and traffic management rules for the network.

The data processing engine 105 is configured to receive a packet from a traffic flow and determine data from the packet, via, for example, deep packet inspection module 110. The packet processing engine 105 may further provide traffic actions, for example, charging or restricting traffic flows. The deep packet inspection module 110 may perform application recognition or determine parameters associated with the traffic flow, for example, application type, content, IP addresses, and the like.

The data collection module 120 is configured to collect and determine data related to the traffic flow, including for example, server IP, DNS data, tunneling data and the like. The data may be received from the data processing engine, and Fastpath and Application layer 115, or may be determined by the data collection module 120. The data collection module may provide for this information to be stored and be used by the other modules of the system.

The data correlation module 130 may retrieve or receive the information from the data collection module and may review the data against previously cached data to determine the trustworthiness or trust score for each aspect associated with the traffic flow. In some cases, the Data correlation module may review data previously stored in a CDN database 125 to review against the collected data.

The traffic classification module 140, may receive a trust score from the data correlation module 130 to determine whether the flow is trusted or if further data should be reviewed. In some cases, the fraudulent detection module 140 may determine the flow is fraudulent and request that the packet processing engine 110 take action on the traffic flow.

Figure 5:
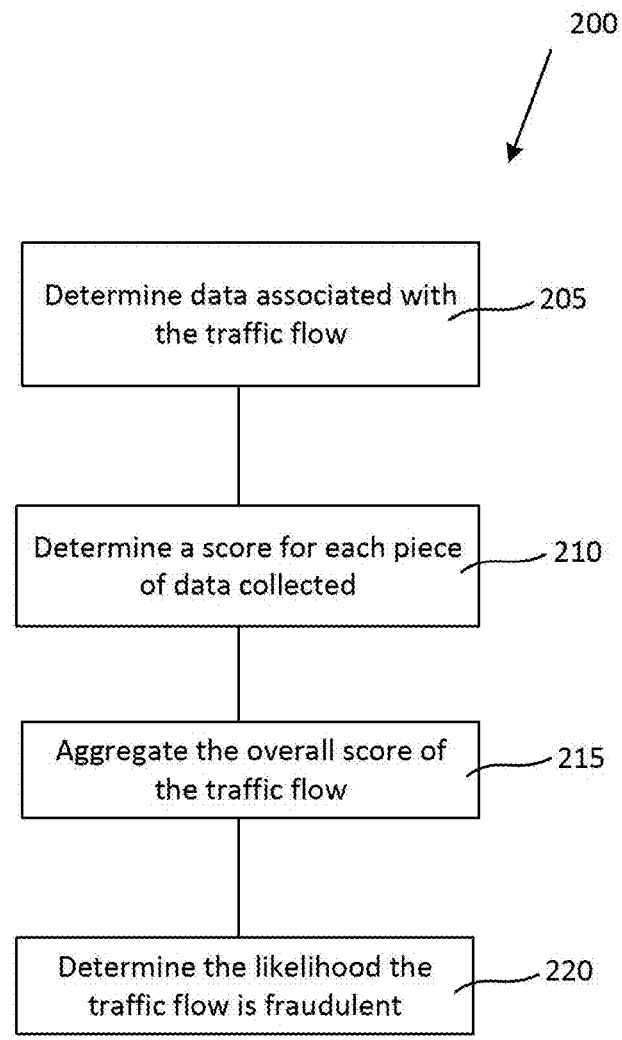
FIG. 5 illustrates an embodiment of a method for fraudulent traffic detection.

FIG. 5 illustrates a high-level flow chart of a method 200 for fraud detection according to an embodiment. The packet processing module 110 may identity a new or amended traffic flow. At 205, the data collection module 120 collects data associated with the traffic flow. In some cases, the data collection module may determine DNS data, server data and the like associated with the traffic flow. At 210, the data validation module 130 may determine a score associated with each of the collected data pieces associated with the traffic flow. For example, the data validation module 130 may consider DNS cache validation, server IP profile, CDN based correlation, machine learning behavior and the like.

At 215, the fraud detection module may aggregate the trust scores for each data point that received a trust score for an overall score. At 220, the fraudulent detection module may determine the likelihood the traffic flow is fraudulent. If the fraudulent detection module determines the traffic flow is fraudulent, the packet processing module may then perform an appropriate traffic action, such as charging for the flow, blocking the flow, or the like.

Embodiments of the system and method are intended to provide for a rule and ranking based system and method to correlate a plurality of sources of verifiable (true) and/or partially true information to confirm a trust level of a flow and classification. The confirmed trust level may be used to take a decision on the classification of the flow to provide the appropriate traffic flows to the subscriber.

In some cases, the system may review and determine data, such as:

DNS Response coming from a trusted DNS server;

Server Profile Information (for example: the content type and/or application the server is capable of delivering);

Content Delivery Network (CDN) provider known to be used by the application;

Machine learning based traffic category validation and updating the server profile about the result;

And/or other new techniques that are used to identify an application or the content type of the traffic.

This data is reviewed and determined while profiling the traffic flow. The collected or determined data may then be correlated. Based on the strength of the information a score or rank may be provided for each piece of information or data collected. The strength may be determined as part of the signature of the traffic.

Based on an aggregate of the determined data and its associated score, the traffic flow's trustworthiness is determined. If the traffic flow's trustworthiness is below a predetermined configurable threshold, the traffic flow may be determined as a fraudulent traffic flow.

When the DNS data becomes encrypted, this data will not be able to be the only source of information for validation of the genuineness or trustworthiness of a traffic flow. Embodiments of the system and method detailed herein are intended to use a plurality of different pieces of information with different score values assigned to the various pieces of information. In an example, if a DNS answer is received from a trusted server, this piece of information may be scored with high credibility, for example, 10 out of 10, perfect score, or the like. If the server IP is seen delivering tunnelling content for 50% of time and the content provider does not deliver tunneling content, the trust score of this data may be lower, for example, 5 out of 10, 50%, or the like. Similarly with a plurality of correlation points providing a trust score, the system is configured to aggregate, for example to sum, the trust scores to get a total score. The total score may be passed as a trust score for the associated traffic flow. Traffic actions or other regulatory decisions may be made based on the total trust score of the traffic flow.

Figure 6:
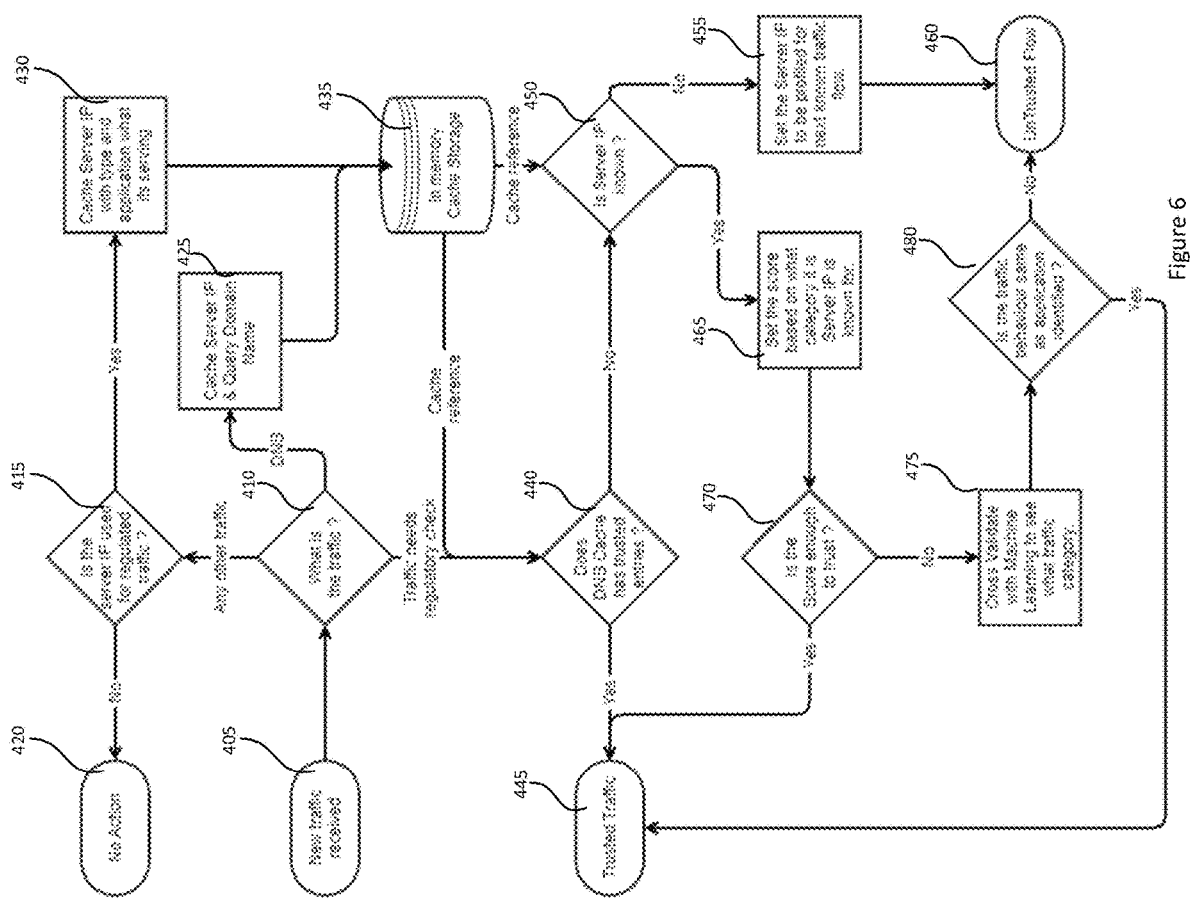
FIG. 6 illustrates a more detailed method for fraudulent traffic detection according to an embodiment.

FIG. 6 illustrates a method 400 having a plurality of stages to determine whether the traffic flow is fraudulent or trusted. It will be understood that these stages may be customized or configured based on various use cases of the operator. The method assigns a score value to each of the traffic flows reviewed by the system. Various techniques such as DNS response cache, server IP address profile data, CDN based correlation info, machine learning behavior and the like may be used to determine a total score of the traffic flow as detailed herein.

A new traffic flow is received at 405. The data processing engine is configured to determine the type of traffic flow received, at 410, via, for example, deep packet inspection, application recognition, or the like. If there is no DNS determined, at 415, it is determined whether the server IP is used for regulated traffic. If it is not used for regulated traffic no action will be taken, at 420.

If the server is regulated traffic the server IP will be cached with the application type at 430. Further, at 425, the server IP may also be cached and the domain name may be queried, for traffic with DNS information that is reviewed. An incoming traffic flow with DNS information is checked for known domain patterns, which may be stored in a memory cache at 435. Whenever there is a flow that needs regulatory validation, the server IP of the flow is cross checked with DNS cache. If the server IP is available in the DNS cache. The data collection module may also determine or check the traffic flow for a content provider's domain.

In some cases, when a regulatory check flow arrives, the flow may be reviewed and validated against a CDN database, for example, the CDN database 125 associated with the system, for the associated CDN. Determining a signature within the traffic flow is intended to provide information on possible CDN providers for each regulated application of a regulated traffic flow. The system is configured to cross check this information for the regulated flow for trust score.

Whenever a regulatory content is served from a server IP, the same is profiled for type of content delivery and applications the server is serving using a machine learning traffic type classification, or other techniques, which may provide the flow classification based on the traffic flow's characteristics in the network. If the server is serving more than one type of application, the ratio of the types of applications tends to be monitored and maintained over time. When a traffic flow is received for the target server IP, the traffic flow is checked for appropriate content type and/or application. In a specific example, the traffic classified based on a traditional signature is Facebook traffic and the server profile has been determined to be web browsing 70% of the time and streaming 30% of the time. The traffic flow would be marked as trusted as Facebook is known to deliver these two types of traffic. If the traffic flow had a different classification not normally served by the server profile, the traffic may be considered to be untrustworthy.

When regulated content needs to be validated, via for example the data correlation module, the data may be passed to a machine learning model, stored for example in the memory component, to understand the traffic category the flow relates to based on the traffic characteristics. The traffic flow may also be cross checked with the signature pattern identified, the traffic pattern's application behavior and its application category.

The data is collected, and a score is determined based on the data collected. Further, regulations are intended to be enforced based on the collected data and score.

At 440, the traffic flow and DNS cache is reviewed to determine if the trust score is sufficient, and the traffic flow can be considered trusted traffic at 445. If the trust score is not above a predetermined threshold, the flow may be validated with subsequent sequence of techniques for cross validation.

In a conventional system, when a matching DNS pattern is seen earlier, the actual data flow is trusted automatically and if the DNS pattern is not previously determined as safe, the data flow is not trusted. As can be seen, using this conventional system, flows where the DNS pattern is encrypted and not available are automatically not trusted, even if the traffic flow is legitimate.

In the system detailed herein, there is intended to be both encrypted and unencrypted DNS passing through the network. Conventional systems are not able to process any of the encrypted DNS traffic. If the DNS information is not available in the traffic flow, the DNS information may have gone via encrypted channels, or it may be missing, and the flow should not be trusted. As the system detailed herein is intended to work with both encrypted and non-encrypted traffic, the method is intended to take various parameters in order to decide whether a flow can be trusted and not rely solely on the DNS information.

The order of various validation techniques may depend on the use case and may vary from flow to flow, by operator or the like. It will be understood that there are a plurality of various orders and validation sequences that may be done.

In a specific example, a zero rate validation use case DNS cache validation may be used as a first technique to be checked. For a regulatory blocking case, machine learning validation may be used as a first technique.

In the method shown in FIG. 6, if the DNS is not a trusted entity, the server IP may be reviewed, at 450. If the server IP is not known, the Server IP can be set to profile for next known traffic flows, at 455, and this traffic flow may be considered untrusted, at 460. Traffic flows that are not trusted may be blocked or may be subject to other traffic actions, for example, higher billing rates, reprioritization, or the like.

If the Server IP is known, a score may be determined based on the category of traffic for the Server IP, at 465. The trust score of the traffic flow may be reviewed, at 470, and determined whether the score is high enough to be considered trusted traffic, at 445.

If the score is not yet above a predetermined threshold hold, there may be cross validation with machine learning associated with the traffic category at 475. If the machine learning determines the behavior is the same as the identified application, at 480, the traffic may be considered trusted, at 445. If not, the traffic may be considered an untrusted traffic flow, at 460.

The method is provided to review various techniques to determine the validity of each traffic flow. As the traffic flow is reviewed by each technique, the flow may be able to be considered trusted or untrusted, and appropriate traffic action or analytics may be formed for that traffic flow. Once a traffic flow has a score that sets the trust level as genuine or fraudulent, regulatory decisions such as restricting the flow or charging for the flow may be initiated.

Embodiments of the system and method are intended to improve the accuracy of detecting fraudulent flow. Further, the system and method are intended to work even if the entire DNS is encrypted as the system and method do not rely solely on the DNS entry. Using the DNS entry as only one point of validation allows the system and method to provided trust scores whether or not the DNS entry is encrypted.

Embodiments of the system and method are intended to run automatically so as to not require manual updating each time a fraudulent flow is detected. Further, the system is intended to be easy to configure and update if other trust sources are determined or other data validation is considered relevant.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be affected to the particular embodiments by those of skill in the art without departing from the scope, which is defined solely by the claims appended hereto.

What is claimed is:

1. A method for detecting fraudulent traffic in a computer network, the method comprising:
   receiving a packet from a traffic flow;
   determining data associated with the traffic flow, wherein determining the data associated with the traffic flow comprises:
     determining whether there is a Domain Name Server (DNS) response from a trusted DNS server, and if so, determining DNS data;
     determining profile information associated with a server associated with the traffic flow, wherein the profile information associated with the server comprises an application type ratio served by the server; and
     determining Content Deliver Network (CDN) data about the server associated with the traffic flow;
   determining a score associated with each piece of determined data, wherein determining the score comprises determining the application type of the traffic flow and comparing the application type with the application type ratio served by the server;
   aggregating each score associated with each piece of data to obtain an overall score for the traffic flow; and
   determining whether the traffic flow is trusted based on the overall score.

2. The method of claim 1, further comprising:
   comparing the CDN information with previously stored CDN information; and
   determining a score associated with the trustworthiness of the CDN information based on the comparison.

3. The method of claim 1, further comprising: using machine learning to identify a traffic type of the traffic flow.

4. The method of claim 1 wherein the traffic flow is considered trusted if the overall score is above a predetermined threshold.

5. The method of claim 1, further comprising: blocking the traffic flow if the traffic flow is considered to be not trusted.

6. The method of claim 1, further comprising: applying traffic actions to the traffic flow if the traffic flow is considered to be not trusted.

7. A system for detecting fraudulent traffic in a computer network, the system comprising at least one processor configured to execute instructions stored in a memory component wherein the instructions provide for:
   a data processing engine configured to receive a packet from a traffic flow;
   a data collection module configured to determine data associated with the traffic flow, wherein determining the data associated with the traffic flow comprises:

determining whether there is a non-encrypted Domain Name Server (DNS) response, and if so determining DNS data;

determining profile information associated with a server associated with the traffic flow, wherein the profile information associated with the server comprises an application type ratio served by the server; and determining Content Delivery Network (CDN) information about the server associated with the traffic flow;

a data correlation module configured to determine a score associated with each piece of determined data, wherein determining the score comprises determining the application type of the traffic flow and comparing the application type with the application type ratio served by the server and aggregate each score associated with each piece of data to obtain an overall score for the traffic flow; and a traffic classification module configured to determine whether the traffic flow is trusted based on the overall score.

8. The system of claim 7, wherein the data correlation module is configured to:
compare the CDN information with previously stored CDN information; and
determine a score associated with the trustworthiness of the CDN information based on the comparison.

9. The system of claim 7, wherein the data correlation module is configured to use machine learning to identify a traffic type of the traffic flow.

10. The system of claim 7 wherein the traffic flow is considered trusted if the overall score is above a predetermined threshold.

11. The system of claim 7, wherein the data processing engine is further configured to block the traffic flow if the traffic flow is considered to be not trusted.

12. The system of claim 7, wherein the data processing engine is further configured to provide traffic actions to the traffic flow if the traffic flow is considered to be not trusted.

* * * * *